United States Patent
Seyffert et al.

(10) Patent No.: US 11,040,684 B2
(45) Date of Patent: Jun. 22, 2021

(54) VEHICLE OCCUPANT RESTRAINT DEVICE AND METHOD FOR OPERATING A VEHICLE OCCUPANT RESTRAINT DEVICE

(71) Applicant: TRW Automotive GmbH, Alfdorf (DE)

(72) Inventors: Martin Seyffert, Pfullingen (DE); Simon Kramer, Schorndorf (DE); Marco Wahl, Sulzbach-Laufen (DE); Silke Leger, Alfdorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 28 days.

(21) Appl. No.: 16/487,497

(22) PCT Filed: Feb. 21, 2018

(86) PCT No.: PCT/EP2018/054266
§ 371 (c)(1),
(2) Date: Aug. 21, 2019

(87) PCT Pub. No.: WO2018/153908
PCT Pub. Date: Aug. 30, 2018

(65) Prior Publication Data
US 2020/0055479 A1 Feb. 20, 2020

(30) Foreign Application Priority Data
Feb. 24, 2017 (DE) .......................... 102017103826.4

(51) Int. Cl.
*B60R 21/015* (2006.01)
*B60R 21/203* (2006.01)
*B60R 21/205* (2011.01)
*B60R 21/2338* (2011.01)
*B60R 21/2346* (2011.01)
*B60R 21/00* (2006.01)
*B60R 21/01* (2006.01)
*B60R 21/231* (2011.01)

(52) U.S. Cl.
CPC ...... *B60R 21/01512* (2014.10); *B60R 21/203* (2013.01); *B60R 21/205* (2013.01);
(Continued)

(58) Field of Classification Search
CPC .... B60R 2021/23107; B60R 21/01512; B60R 21/203; B60R 21/205; B60R 21/2338;
(Continued)

(56) References Cited

U.S. PATENT DOCUMENTS

| 5,626,359 A | 5/1997 | Steffens, Jr. et al. |
| 5,934,701 A * | 8/1999 | Furukawa ............. B60R 21/231 280/729 |

(Continued)

FOREIGN PATENT DOCUMENTS

| DE | 19628837 | 1/1997 |
| JP | 04055141 A * | 2/1992 |

(Continued)

*Primary Examiner* — Drew J Brown
(74) *Attorney, Agent, or Firm* — Tarolli, Sundheim, Covell & Tummino LLP

(57) ABSTRACT

A vehicle occupant restraint device comprises a control unit and a group of at least two matched airbags (20, 24; 22, 26) for the protection of a vehicle occupant (10; 16) on a particular vehicle seat (12; 16). The control unit is arranged and the airbags (20, 24; 22, 26) are disposed and designed so that, in a collision case, the control unit differentiates between a first situation in which the vehicle occupant (10; 16) is located in a standard distance area relative to a first airbag (20; 22) and a second situation in which the vehicle occupant (10; 16) is located in a rear area which is further distant from the first airbag (20; 22) than the standard distance area. When the first situation is given, the control unit activates the first airbag (20; 22) only. In contrast, when the second situation is given, the control unit activates the first airbag (20; 22) and additionally at least a second airbag (24; 26) of the group, with the first airbag (20; 22) backing the second airbag (24; 26).

12 Claims, 1 Drawing Sheet

(52) U.S. Cl.
CPC ...... *B60R 21/2338* (2013.01); *B60R 21/2346* (2013.01); *B60R 2021/0044* (2013.01); *B60R 2021/01034* (2013.01); *B60R 2021/01286* (2013.01); *B60R 2021/23107* (2013.01)

(58) Field of Classification Search
CPC ........ B60R 21/2346; B60R 2021/0044; B60R 2021/01034; B60R 2021/01286; B60R 2021/23146; B60R 21/231
See application file for complete search history.

(56) References Cited

U.S. PATENT DOCUMENTS

| | | | |
|---|---|---|---|
| 6,270,115 | B1 | 8/2001 | Andreen et al. |
| 7,029,030 | B2 * | 4/2006 | Amamori ................ B60R 21/23 280/730.1 |
| 10,836,337 | B2 * | 11/2020 | Shin ...................... B60R 21/233 |
| 2005/0184489 | A1 | 8/2005 | Kobayashi |
| 2005/0230945 | A1 | 10/2005 | Watanabe |
| 2007/0210565 | A1 * | 9/2007 | Song ................... B60R 21/2165 280/732 |
| 2011/0140399 | A1 | 6/2011 | Kuhlmann |
| 2016/0297392 | A1 * | 10/2016 | Schneider ............. B60R 21/206 |
| 2018/0334131 | A1 * | 11/2018 | Shin ...................... B60R 21/217 |
| 2019/0135220 | A1 * | 5/2019 | Rupp .................... B60R 21/237 |
| 2019/0299912 | A1 * | 10/2019 | Tanaka .................. B60R 21/233 |
| 2019/0381968 | A1 * | 12/2019 | Kwon ................... B60R 21/239 |
| 2020/0062211 | A1 * | 2/2020 | Deng .................... B60R 21/205 |
| 2020/0094770 | A1 * | 3/2020 | Fischer ................. B60R 21/231 |
| 2020/0180537 | A1 * | 6/2020 | Choi ..................... B60R 21/207 |

FOREIGN PATENT DOCUMENTS

| | | | | |
|---|---|---|---|---|
| JP | 2000168486 | | 6/2000 | |
| JP | 2001106008 A | * | 4/2001 | ....... B60R 21/01512 |
| WO | 0021797 | | 4/2000 | |

* cited by examiner

VEHICLE OCCUPANT RESTRAINT DEVICE AND METHOD FOR OPERATING A VEHICLE OCCUPANT RESTRAINT DEVICE

RELATED APPLICATIONS

This application corresponds to PCT/EP2018/054266 filed Feb. 21, 2018, which claims the benefit of German Application No. 10 2017 103 826.4 filed Feb. 24, 2017, the subject matter of which are incorporated herein by reference in their entirety.

BACKGROUND OF THE INVENTION

The invention relates to a vehicle occupant restraint device. Further, the invention relates to a method of operating a vehicle occupant restraint device of this type.

Automated or autonomous driving is classified into several stages in Europe and in the U.S. In the so-called "level 3" that is referred to as "high automation", the driver need not permanently monitor the system. Rather, the vehicle automatically performs functions such as indicating, changing lanes and keeping the lane. Said stage of automation enables the driver to adopt a position convenient to her/him at any seat adjustment within the scope of a predetermined of seat adjustment field.

Moreover, new vehicle concepts permit new interior designs, e.g. having significantly slimmer instrument panels and new steering wheel concepts. For example, the steering wheel can be stored in the instrument panel depending on the driving state, as it is not required during automated driving.

It is a result of the afore-described changes that the occupant protection concept of a vehicle no longer can be developed toward specific standard positions as today, but that the vehicle occupants will obtain more degrees of freedom as regards their activities and positions in the interior. As a consequence, the positions of the vehicle occupants relative to the safety systems, such as seat belts and airbags, which used to be tightly attached to the vehicle structure, will be variable during driving and the distances may be significantly increased as compared to the standard positions depending on the situation.

Known solutions are e.g. airbags having enlarged volumes, larger covering areas, larger or multi-stage inflators, adaptations by openings which may be designed to be switchable ("vents") or variable shapes by tear seams or switched tethers, where appropriate.

Increased airbag volumes and, resp., active areas entail longer periods for reaching the effective position of the airbags, however. Larger and/or quicker inflators are not adapted to compensate for this at will without lastingly changing the effect of the airbag. For example, an airbag deploying more quickly and at a higher mass flow rate may act "more aggressively" vis-à-vis the vehicle occupant in a so-called "out-of-position" test and therefore may not stand the test.

Furthermore, an increase in the airbag for bridging a larger distance while the internal pressure remains equal would still produce a force-displacement characteristic different from that of a respective airbag which only has to bridge the distance given for a standard position. If such characteristic curve appears too flat, e.g. the pressure inside the airbag could be increased; but the characteristic curve, just as the restraining effect, would still remain different.

Since the point in time at which an airbag inside the vehicle has to become effective for the vehicle occupant is fixed, longer deployment times may result in the fact that the decision for activating the airbag would have to be taken already before the object of collision is initially contacted. Such pre-crash concept requires appropriately safe release in a collision case and appropriately safe prevention of release if the occupant protection measure is not required after all. Such pre-crash identifying systems are being developed however, at present sufficiently safe systems are not yet available.

From EP 1 086 860 A2 a classic generic vehicle occupant restraint device is known that does not yet consider the changed circumstances and requirements of autonomous driving. Apart from a first airbag for protecting the thorax region of the vehicle occupant, a second airbag which at least partially extends across the windscreen of the vehicle in the deployed state is provided for backing the first airbag.

SUMMARY OF THE INVENTION

It is the object of the invention to provide an occupant protection system which depending on the occupant position becomes sufficiently effective at the usual distance from the vehicle occupant or, in a different situation, at a significantly increased distance and which is ignited just as today's systems by the usual crash algorithms after collision.

This object is achieved by a vehicle occupant restraint device comprising the features of claim 1 as well as by a method of operating a vehicle occupant restraint device comprising the features of claim 11. Advantageous and useful configurations of the vehicle occupant restraint device according to the invention and of the method according to the invention are stated in the related subclaims.

The vehicle occupant restraint device according to the invention comprises a control unit and a group of at least two matched airbags for protecting a vehicle occupant sitting on a particular vehicle seat. In accordance with the invention, the control unit is arranged and the airbags are disposed and designed so that, in a collision case, the control unit differentiates between a first situation in which the vehicle occupant is located in a standard distance area relative to a first airbag and a second situation in which the vehicle occupant is located in a rear area that is further distant from the first airbag than the standard distance area, and that, when the first situation is given, the control unit activates the first airbag only. In contrast, when the second situation is given, the control unit activates the first airbag and additionally at least a second airbag of the group, with the first airbag backing the second airbag.

Relating to the driver, here a standard distance area is understood to be an area in which the sitting position of the driver is typically located, when the driver him-/herself is steering the vehicle, i.e. is operating the foot pedals and the steering wheel. In particular, this area is to be adapted to a driver of average physical constitution. For the passenger the standard distance area is meant to be an area corresponding to the afore-described area, comparable to the typical seat adjustment area of a classical vehicle that cannot drive autonomously. Sitting positions of the driver and the passenger which are located behind the standard positions have to be distinguished herefrom. Such sitting positions usually cannot be adopted, at least not by the driver, in classical vehicles which cannot be driven autonomously. The vehicle occupant restraint device according to the invention offers reliable occupant protection both for the standard positions and for the positions located there behind.

The invention is based on the finding that in an autonomously drivable vehicle the distance between the mounting position of an airbag, especially the steering wheel or the instrument panel, and the vehicle occupant may extremely vary depending on the current sitting position of the occupant. The vehicle occupant restraint device according to the invention therefore decides depending on the current sitting position of the respective vehicle occupant whether or not an additional airbag (or even plural airbags) will be activated. It is not necessary to activate another airbag as long as the vehicle occupant is sitting in a standard position, viz. within the standard distance area. If the vehicle occupant is sitting or lying behind the latter, however, at least two airbags assigned to the occupant which are contact and backing each other will be activated.

It has to be observed in this context that, in the case of two activated airbags, the vehicle occupant will not primarily contact the first airbag, as this would be the case in the normal sifting position, but will contact the additionally activated second airbag, for said second airbag bridges the additional space between the vehicle occupant and the first airbag, when the vehicle occupant is in a rear sitting position. Hence, for reliably exerting the restraining function the two airbags are so-to-speak connected in series.

As far as a distinction is made between the protection of the driver and that of a passenger sifting next to him/her in a front seat, the first airbag accordingly is preferred to be either a driver airbag accommodated in the steering wheel of the vehicle or a passenger airbag accommodated in the instrument panel of the vehicle.

So that the first airbag, in the event of a rear sitting position, may serve as an optimum buffer for the second airbag, the first airbag is preferably disposed and designed so that, in the above-explained second situation, after deployment thereof is disposed between the steering wheel or the instrument panel of the vehicle and the second airbag which is assigned to the vehicle occupant.

As mentioned already, in the event of a rear sitting position of the vehicle occupant, it is the additionally activated second airbag on which the occupant impacts. According to a preferred embodiment of the invention, the second airbag is a thorax airbag, i.e. the second airbag is disposed and designed so that it contacts the thorax region of the vehicle occupant.

Basically, the concept of the invention can also be applied to other body parts of the vehicle occupant. For example, the second airbag might be a knee, head or side airbag that is activated when needed and interacts with an appropriately disposed and designed first airbag.

The second airbag is preferably accommodated in the seat of the vehicle occupant.

Depending on the application, it may also be advantageous to accommodate the second airbag in the instrument panel, in the roof liner or in a seat belt of the vehicle.

In the event of activation of the second airbag, the first airbag may back the second airbag in different ways. On the one hand, the first airbag may be disposed and designed such and may have such a high internal pressure in the deployed state that it backs the second airbag when the vehicle occupant impacts on the second airbag. In this way, the second airbag is held at a predetermined position and offers sufficient resistance so that the vehicle occupant cannot move excessively forward.

In this context, it is of advantage to dispose and design the second airbag so that in the deployed state, when the vehicle occupant impacts on the second airbag, it exerts a cushioning function to counter-act any rebounding of the vehicle occupant.

For this purpose, the second airbag may include discharge ports or tethers which are preferably switchable.

The effects of the two airbags may also be reversed, however. In such case, the cushioning is achieved by the first airbag, by switchable discharge orifices or tethers, where appropriate, and the second airbag prevents the vehicle occupant from moving excessively forward.

The invention also provides an autonomously drivable vehicle comprising a vehicle occupant restraint device according to the invention. As explained in the beginning, exactly those vehicles offer sitting positions for the vehicle occupants that are located behind the standard positions and therefore require particular protective measures. Said requirements are met in an especially advantageous manner by the vehicle occupant restraint device according to the invention.

The method of operating a vehicle occupant restraint device according to the invention which includes a control unit and a group of at least two matched airbags for the protection of a vehicle occupant in a particular vehicle seat comprises the following steps:

in a collision case, the control unit differentiates between a first situation in which the vehicle occupant is located in a standard distance area relative to a first airbag and a second situation in which the vehicle occupant is located in a rear area that is further distant from the first airbag than the standard distance area;

when the first situation is given, the control unit activates the first airbag only;

when the second situation is given, the control unit activates the first airbag and, in addition, at least a second airbag of the group, with the first airbag backing the second airbag.

Concerning the advantages of the method according to the invention, reference can be made to the corresponding remarks on the vehicle occupant restraint device according to the invention.

For making a distinction between the two situations, i.e. whether the vehicle occupant is located in a standard position or in a rear position, it turns out to be useful that the control unit detects the sitting position of the vehicle occupant by means of sensors. Said detection should be continuous so that the current sitting position of the vehicle occupant is constantly known.

BRIEF DESCRIPTION OF THE DRAWINGS

Further features and advantages of the invention will be evident from the following description of an example embodiment which is understood to be not limiting and from the enclosed drawings which are referred to and wherein.

DESCRIPTION

Figure 1:
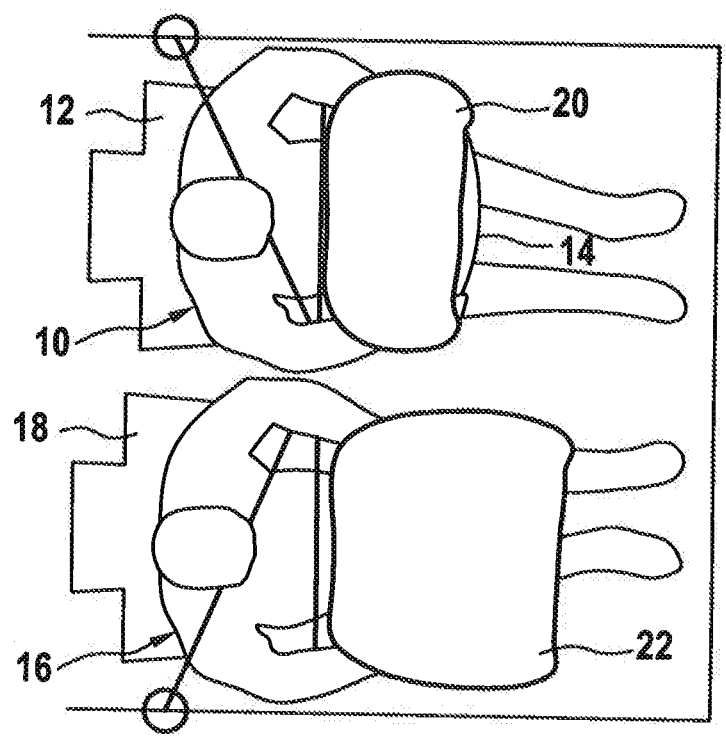
FIG. 1 shows a top view onto an activated vehicle occupant restraint device according to the invention including two vehicle occupants in a normal sitting position.
Figure 2:
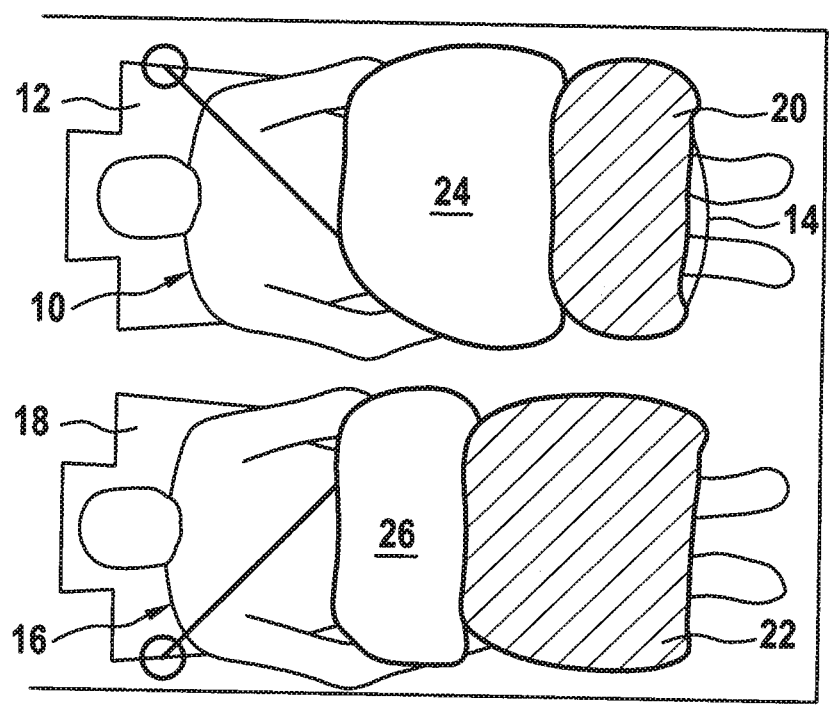
FIG. 2 shows a top view onto an activated vehicle occupant restraint device according to the invention including two vehicle occupants in a rear sitting position.

FIGS. 1 and 2 schematically illustrate part of a front vehicle interior of a vehicle that is capable of driving autonomously.

In FIG. 1 a driver 10 having a substantially upright upper body sits in a driver seat 12 within reach of the vehicle steering wheel 14. The passenger 16 sits in a similar position in a passenger seat 18. Especially the position of the driver 10 corresponds to a typical driver position during normal non-autonomous driving. Said sitting positions shall be referred to as standard positions in the following.

In FIG. 2 the driver 10 sits in the driver seat 12 with his/her upper body being strongly inclined to the rear or even (almost) lying in a rear position outside the reach of the vehicle steering wheel 14. The passenger 16 sits in a passenger seat 18 in a similar position. Said positions may be adopted during autonomous driving and, to distinguish them from the afore-described standard positions—irrespective of the inclination of the upper body—, they shall be referred to as rear positions in the following.

In the steering wheel 14 in front of the driver 10 a driver airbag, hereinafter referred to as first driver airbag 20, is accommodated. The first driver airbag 20 has an inflatable volume of from 60 to 80 liters, for example.

In the instrument panel ahead of the passenger 16 a passenger airbag, hereinafter referred to as first passenger airbag 22 is accommodated. The first passenger airbag 22 has an inflatable volume of from 160 to 180 liters, for example.

In the standard positions shown in FIG. 1, each of the driver 10 and the passenger 16 is located in a standard distance area from the first driver airbag 20 and, resp., from the first passenger airbag 22. In the rear positions shown in FIG. 2, the driver 10 and, resp., the passenger 16 in comparison have a larger distance from the first driver airbag 20 and, resp., from the first passenger airbag 22 than in the standard positions.

A second driver airbag 24 is accommodated in the driver seat 12. According to the example embodiment shown here, the second driver airbag 24 has a larger inflatable volume than the first driver airbag 20, for example from 90 to 120 liters. The first driver airbag 20 and the second driver airbag 24 form a group of driver airbags which are provided in the driver seat 12 for the protection of the driver 10. Said group may include even further driver airbags.

A second passenger airbag 26 is accommodated in the passenger seat 18. According to the example embodiment shown here, the second passenger airbag 26 has a smaller inflatable volume than the first passenger airbag 22, for example from 70 to 80 liters. The first passenger airbag 22 and the second passenger airbag 26 constitute a group of passenger airbags provided on the passenger seat 18 for the protection of the passenger 16. Said group may include even further passenger airbags.

The airbags 20, 22, 24, 26 and a control unit provided to activate the latter (not separately shown in the Figures) are parts of a vehicle occupant restraint device. The control unit identifies the sitting positions of the vehicle occupants 10, 16 by means of appropriate sensors. In particular, the control unit can differentiate between a normal sitting position, in which the driver 10 or, resp., the passenger 16 is located in the standard distance area with respect to the first driver airbag 20 or, resp., the first passenger airbag 22, and a rear sitting position, in which the distance of the driver 10 or, resp., the passenger 16 from the assigned first airbag 20 or, resp., 22 is larger.

In the event of vehicle collision related to an activation of airbags for the protection of the vehicle occupants 10, 16, the activation behavior of the control unit is dependent on the identified sitting positions of the vehicle occupants 10, 16, as will be explained below.

If, for example, the situation shown in FIG. 1 in which the driver 10 and the passenger 16 adopt a normal (front) sitting position, the control unit only activates the first driver airbag 20 and the first passenger airbag 22. In this case, the first driver airbag 20 that deploys out of the steering wheel 14 and, resp., the first passenger airbag 22 that deploys out of the instrument panel solely takes over the restraining function and cushions the vehicle occupant 10 or, resp., 16 moving forward and especially his/her thorax region.

If the driver 10 and the passenger 16 are located, as shown in FIG. 2, in a rear sitting position, however, the control unit activates the first driver airbag 20 and additionally the second driver airbag 24 as well as the first passenger airbag 22 and additionally the second passenger airbag 26. The first driver airbag 20 and the second driver airbag 24 are matched as regards the arrangement and the deployment behavior thereof so that the first driver airbag 20 deploying out of the steering wheel 14 fulfills a backing function for the second driver airbag 24 deploying out of the driver seat 12, which function shall be described in detail below. This applies mutatis mutandis to the first passenger airbag 22 and the second passenger airbag 26.

After deployment of the two airbags 20, 24, the first driver airbag 20 is arranged between the steering wheel 14 and the second driver airbag 24. This means that the driver 10, especially the thorax region thereof when he/she is located in a rear sitting position, does not contact the first driver airbag 20 but the second driver airbag 24. Accordingly, in this situation the second driver airbag 24 takes over the cushioning function while it is backed by the first driver airbag 20. This in turn applies mutatis mutandis to the first passenger airbag 22 and the second passenger airbag 26 with respect to the passenger 16.

The afore-mentioned backing function of the first driver airbag 20 and, resp., of the first passenger airbag 24 may either primarily be a backing function or primarily be a cushioning function:

In the first case, the first driver airbag 20 and, resp., the first passenger airbag 22 has a comparatively high internal pressure over a rather long period. It may even be provided that filling takes place which, as compared to the situation shown in FIG. 1, results in a higher internal pressure to optimally ensure the backing function. The second driver airbag 24 or, resp., the second passenger airbag 26 cushions the impact of the vehicle occupant 10 or, resp., 16, with switchable discharge orifices, tethers etc. being provided, where needed, so that the direction of the kinetic energy of the vehicle occupant 10 or, resp., 16 will not abruptly be reversed.

In the second case, the second driver airbag 24 or, resp., the second passenger airbag 26 has a comparatively high internal pressure, while the first driver airbag 20 or, resp., the first passenger airbag 22 is intended to cushion the impact of the vehicle occupant 10 and, resp., 16. Accordingly, the internal pressure of said airbag is adapted to said requirement, which can be supported by possibly switchable discharge orifices, tethers etc.

As a matter of course, the control unit can also identify situations in which not, as in FIG. 1, both vehicle occupants 10, 16 adopt a normal position or, as in FIG. 2, a rear position, but only the driver 10 or only the passenger 16 adopts a normal position and the other vehicle occupant 16 or 10 adopts a rear position. In such case, the second airbag 26 and, resp., 24 is additionally activated for the vehicle occupant 16 or, resp., 10 in the rear position only.

Accommodation of the airbags 20, 22, 24, 26 may also be provided at positions other than the afore-described mounting locations. For example, the second driver airbag 24 and/or the second passenger airbag 26 may as well deploy out of the instrument panel, out of the roof liner or out of a seat belt assigned to the respective vehicle occupant.

LIST OF REFERENCE NUMERALS 10 driver
12 driver seat
14 steering wheel
16 passenger
18 passenger seat
20 first driver airbag
22 first passenger airbag
24 second driver airbag
26 second passenger airbag

The invention claimed is:

1. A vehicle occupant restraint device comprising a control unit and a group of at least two matched airbags (20, 24; 22, 26) for the protection of a vehicle occupant (10; 16) sitting in a particular vehicle seat (12; 18), wherein the control unit is arranged and the airbags (20, 24; 22, 26) are disposed and designed so that, in a collision case, the control unit differentiates between a first situation in which the vehicle occupant (10; 16) is located in a standard distance area relative to a first airbag (20; 22) and a second situation in which the vehicle occupant (20; 22) is located in a rear area that is further distant from the first airbag (20; 22) than the standard distance area, and in that, when the first situation is given, the control unit activates the first airbag (20; 22) only, whereas, when the second situation is given, the control unit activates the first airbag (20; 22) and additionally at least a second airbag (24; 26) of the group, with the first airbag (20; 22) backing the second airbag (24; 26).

2. The vehicle occupant restraint device according to claim 1, wherein the first airbag (20; 22) is a driver airbag (20) accommodated in the steering wheel (14) of the vehicle or a passenger airbag (22) accommodated in the instrument panel of the vehicle.

3. The vehicle occupant restraint device according to claim 1, wherein the first airbag (20; 22) is arranged and designed so that in the second situation it is arranged, after being deployed, between the steering wheel (14) or the instrument panel of the vehicle and the second airbag (24; 26).

4. The vehicle occupant restraint device according to claim 1, wherein the second airbag (24; 26) is arranged and designed so that in the second situation it contacts the thorax region of the vehicle occupant (10; 16).

5. The vehicle occupant restraint device according to claim 1, wherein the second airbag (24; 26) is accommodated in the seat (12; 18) of the vehicle occupant (10; 16).

6. The vehicle occupant restraint device according to claim 1, wherein the second airbag (24; 26) is accommodated in the instrument panel, in the roof liner or in a seat belt of the vehicle.

7. The vehicle occupant restraint device according to claim 1, wherein the first airbag (20; 22) is arranged and designed such that, in the deployed state, it has such a high internal pressure that it backs the second airbag (24; 26) when the vehicle occupant (10; 16) impacts on the second airbag (24; 26).

8. The vehicle occupant restraint device according to claim 1, wherein the second airbag (24; 26) is arranged and designed so that in the deployed state it exerts a cushioning function when the vehicle occupant (10; 16) impacts on the second airbag (24; 26).

9. The vehicle occupant restraint device according to claim 1, wherein the first airbag (20; 22) is arranged and designed so that, in the deployed state, it exerts a cushioning function when the vehicle occupant (10; 16) impacts on the second airbag (24; 26).

10. An autonomously drivable vehicle, wherein by including a vehicle occupant restraint device according to claim 1.

11. A method of operating a vehicle occupant restraint device including a control unit and a group of at least two matched airbags (20, 24; 22, 26) for the protection of a vehicle occupant (10; 16) on a particular vehicle seat (12; 18), the method comprising the following steps:
  in a collision case, the control unit differentiates between a first situation in which the vehicle occupant (10; 16) is located in a standard distance area relative to a first airbag (20; 24) and a second situation in which the vehicle occupant (10; 16) is located in a rear area which is further distant from the first airbag (20; 24) than the standard distance area;
  when the first situation is given, the control unit activates the first airbag (20; 24) only;
  when the second situation is given, the control unit activates the first airbag (20; 24) and, in addition, at least a second airbag (22; 26) of the group, with the first airbag (20; 24) backing the second airbag (22; 26).

12. The method according to claim 11, wherein the control unit detects the sitting position of the vehicle occupant (10; 16) by means of sensors.

* * * * *